Patented Feb. 13, 1945

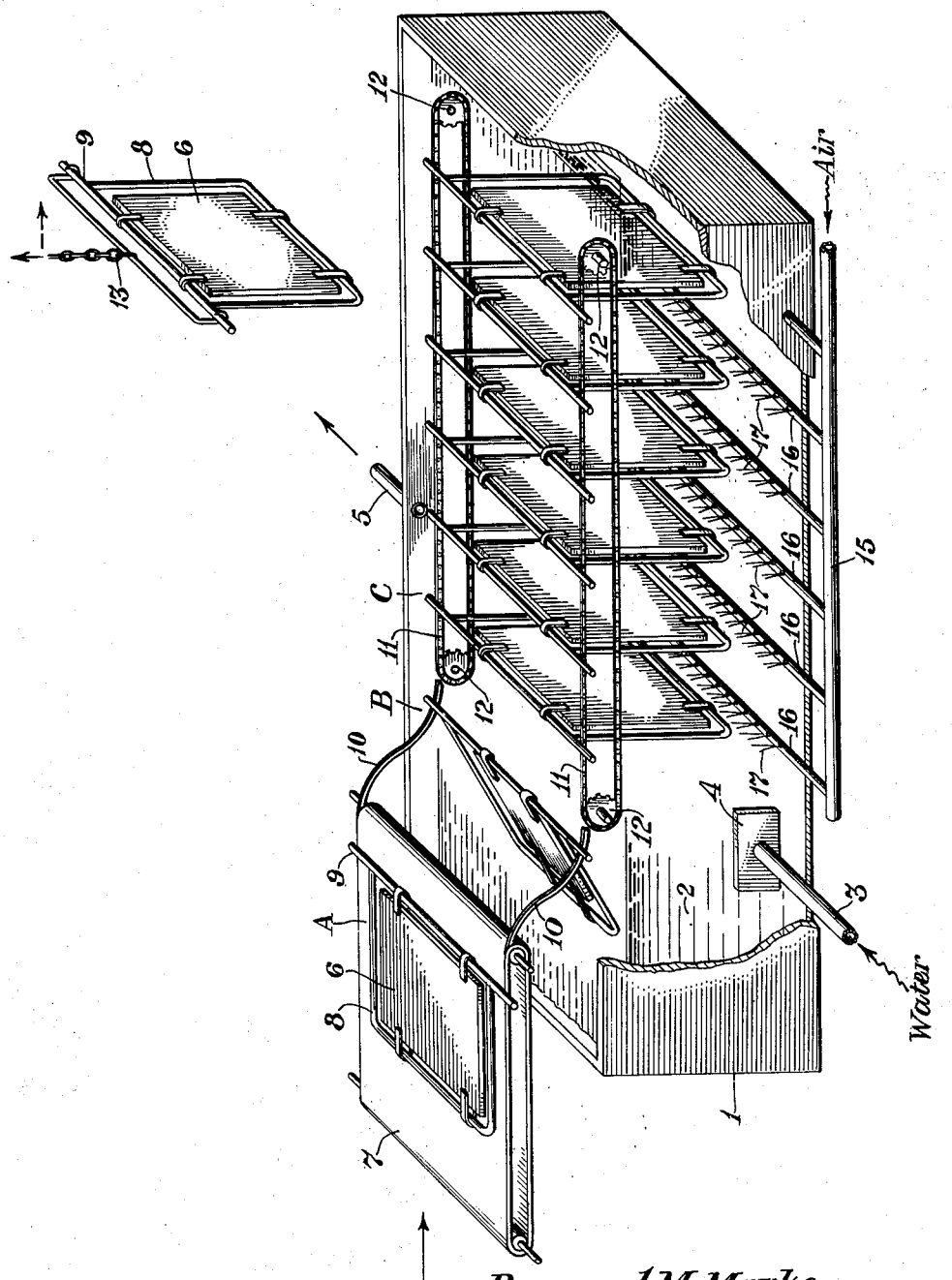

2,369,593

UNITED STATES PATENT OFFICE 2,369,593

PRODUCTION OF CAST SHEETS

Barnard M. Marks, Newark, N. J., and Clayton E. Ranck, Philadelphia, Pa., assignors to E. I. du Pont de Nemours & Company, Wilmington, Del., a corporation of Delaware Application October 16, 1943, Serial No. 506,534

6 Claims. (Cl. 18—58)

This invention relates to the production of cast sheets and, more particularly, to an improved process of producing cast sheets of polymerized compounds.

Liquid polymerizable compounds adapted to yield thermoplastic resins upon being subjected to polymerization conditions, as, for example, methyl methacrylate, have been polymerized in cells heretofore to give cast thermoplastic sheets adapted for use as aircraft enclosures and the like.

The most commonly used procedure for producing these cast sheets comprises the polymerization of the contents of a cell which is made up of two plates separated by a compressible gasket, in a horizontal position in an oven through which warm air is circulated. There are several disadvantages in this procedure. A primary disadvantage is that the nature of air as a transfer medium is such that low temperatures of polymerization must be employed. This results in an uneconomically long polymerization cycle. If higher temperatures are used in order to shorten the polymerization cycle, the heat evolved during the last stage of the polymerization is so great that the air cannot remove it and vapor bubbles are formed in the sheet.

A second disadvantage of this procedure used heretofore resides in the lack of control of temperature variations which causes a low yield in acceptable sheets, i. e., sheets which are designated as "optical quality." A sheet having "optical quality" is defined as one through which parallel light will pass without visible distortions. A sheet may be tested for "optical quality" by passing therethrough parallel light which is then intercepted upon a reflecting surface; any distortion of the light will appear on the reflecting surface as dark spots.

Those skilled in the art learned that more efficient heat transfer was obtainable by carrying out the polymerization of polymerizable compounds in a liquid medium. Polymerizations of this type have been made the subjects of United States Patent 2,045,660 to D. J. Loder and United States Patent 2,067,580 to Otto Rohm. It was further found that the positioning of the cells vertically during polymerization of the cell contents would faciliate efficient heat transfer from the cell due to the fact that heat convections would cause a natural circulation of fluid. However, cells of the type described above for casting sheets, i. e., cells consisting of two plates separated by a compressible gasket whose interspace is filled with a polymerizable liquid, could not be rotated to a vertical position in air without excessive leakage of the cell contents past the gasket and bulging of the cell plates with resulting non-uniform sheet caliper.

An object of the present invention is to provide an improved process for the manufacture of cast sheets of polymerized compounds. A further object is to provide a method by which the cells filled with polymerizable liquid, are transferred from a substantially horizontal assembly position to a substantially vertical polymerization position without leakage or cell distortion. A still further object of the invention is to provide a method which effects a reduction of the polymerization cycle and an improvement of the quality of cast thermoplastic sheets made by polymerization of a polymerizable liquid in a cell immersed in a liquid bath. Other objects will be apparent from the description of the invention given hereinafter.

The above objects are accomplished according to the present invention by filling a cell composed of two plates separated by a compressible gasket, with a polymerizable liquid while the cell is inclined at an angle less than 25° to the horizontal, immersing the cell while thus inclined in a heated liquid bath, thereafter rotating the cell to a substantially vertical position and maintaining it in vertical position until polymerization of the cell contents has taken place, air being passed through the liquid bath to agitate same during the polymerization of the cell contents.

The present invention resides partly in the discovery that the ordinary cell used for casting sheets of polymerized compounds can be positioned vertically for the polymerization reaction without any difficulty, after being filled in substantially horizontal position with the polymerizable liquid, by first immersing the filled cell in the liquid bath while held substantially horizontally and then rotating the cell to vertical position. By following this procedure the heretofore encountered trouble with leakage of the polymerizable liquid and distortion of the cell is completely eliminated because, while the cell is submerged, the hydrostatic head of the cell contents is balanced by that of the liquid bath. Thus a simple and satisfactory means is provided for taking advantage of the more efficient heat transfer afforded by carrying out the polymerization with the cells vertically positioned in a liquid bath.

The invention further resides in the combination of vertically positioning cells in the liquid bath with the feature of passing air through the liquid bath to agitate it during the polymerization of the cell contents, thereby greatly increasing the efficiency of the heat transfer between the cell contents and the liquid bath and, consequently, enabling a greater control of the temperature of the cell contents.

While it is not essential that the cell be positioned precisely vertically in the liquid bath, it is highly important that it be positioned substantially vertically. For example, experimental work has shown that holding the cell at an angle of 45° from the horizontal in the liquid bath results in such poor heat transfer on one side of the cell that a satisfactory grade of sheeting cannot be obtained short of employing such low temperatures of polymerization that the period required for polymerization becomes too great for economical operation.

The particular apparatus employed for carrying out the present invention may be varied widely but the invention will be described more fully in connection with the specfic form of apparatus shown in the accompanying drawing wherein the single figure is a perspective view of the apparatus with parts broken away for purposes of illustration.

Referring to the drawing, there is provided a large tank 1 containing the liquid 2, usually water, which acts as a heat transfer medium. To maintain the temperature of the liquid 2 constant, as is preferred, it is circulated, entering through the inlet pipe 3 and associated perforated distributor plate 4 and leaving through the exit pipe 5.

In carrying out the process, a compressible gasket cell 6, illustrated more or less diagrammatically, is filled with monomeric methyl methacrylate, or other polymerizable liquid, while in horizontal position and is picked up from the cell assembly and filling lines by the traveling belt 7 (see position A). The cell 6 is held in the frame 8 which includes the cross bar 9 along its leading edge. As the cell 6 and frame 8 are carried forward by the traveling belt 7, the cross bar 9 engages the inclined track 10, 10 and is guided down below the surface of the liquid 2. When the rear of the frame 8 passes beyond the traveling belt 7, the cross bar 9 then being submerged, the frame 8 with the cell 6 pivots downward about cross bar 9 (see position B) until it reaches a vertical position (see position C) and the cross bar 9 is supported by the traveling chains 11, 11 carried by the sprockets 12, 12 which are driven at the desired rate by any conventional means. Through this arrangement the cell 6 is kept in substantially horizontal position until immersed in the liquid 2, whereupon it is rotated into vertical position.

The cell 6 supported in its frame 8 is then carried through the tank 1 by the traveling chains 11, 11 and lifted from the tank 1 at the far end by the hoist 13 and conveyed away for further treatment such as stripping, heat treatment, inspection, and the like. Obviously, the rate of travel of the cell 6 through the tank 1 is so adjusted that the cell contents are polymerized to the desired degree by the time the cell 6 is removed from the tank 1.

To provide efficient heat transfer, the liquid 2 in tank 1 is agitated by passing air through the liquid. Means for accomplishing this comprise the air inlet pipe or header 15 and a series of connecting pipes 16 which extend transversely of the tank 1 adjacent its bottom and parallel to the cell 6. The pipes 16 are perforated to permit escape of the air, thus providing constant streams 17 of ascending bubbles through the liquid 2. Through the use of a plurality of perforated pipes 16 positioned parallel to the cell 6, the stream of ascending bubbles 17 pass in close proximity to both sides of each cell 6 as it travels through the tank 1 and in this way efficient and thorough agitation of the liquid 2 adjacent the cells 6 is obtained with consequent improved heat transfer between the cell contents and the liquid 2. A rate of air addition of about 0.6 cubic foot per minute per foot of width of cell with the perforated pipes approximately 6 inches apart has been found satisfactory to give efficient heat transfer although higher rates of addition of air may be used with equal success.

The process of this invention is peculiarly adapted for polymerization of masses whose surface area is great compared to the volume of material being polymerized as, for example, sheets, flat strips, and the like. Due to the improved heat transfer between the cell contents and the liquid bath, higher polymerization temperatures and, therefore, shorter polymerization cycles than heretofore possible may be used to obtain high yields of satisfactory sheets.

The apparatus in the drawing is one specific means well adapted for carrying out the present invention but many other forms of apparatus will be readily devised by those skilled in the art. The important features of the apparatus are the provision of means for rotating the cells from horizontal to vertical while immersed in the liquid bath and the provision of means for passing streams of air bubbles close to the surface of the cells. The rotation of the cells may even be carried out manually if desired.

Specific embodiments of the invention are illustrated in the following examples where all parts are given by weight unless otherwise noted:

*Example I*

The following composition was prepared:

| | Parts |
|---|---|
| Methyl methacrylate monomer | 87 |
| Methyl methacrylate polymer | 3 |
| Dibutyl phthalate | 10 |
| Benzoyl peroxide | 0.1028 |
| Methacrylic acid | 0.005 | and after treatment to remove dissolved oxygen, a predetermined quantity (19.4 pounds) was charged into a slightly tilted (less than 25°) cell, consisting of two 39″ x 51″ clean and polished glass plates separated by a compressible gasket. The space between the glass plates was then adjusted to yield a 0.250 inch sheet with simultaneous removal of trapped air. This filled cell was then fitted into a carrier frame which was submerged into an air agitated water bath maintained at a constant temperature of 150° F. The cell assembly was then rotated to a vertical position and the contents were allowed to polymerize. During the polymerization, the water bath was air agitated at a rate of 2.6 cubic feet per minute. The polymerization reaction was complete in 185 minutes. The cell was then removed from the bath and the glass plates stripped from the plastic sheet by the conventional procedure.

After conventional heat treating, the polymerized sheet thus made was examined with parallel light to determine its "optical quality." The sheet was crystal clear and revealed no optical distortions; it had a finished size of 0.250" x 37" x 49".

Since all sheets to be used for aircraft must be heat treated before they are formed and optical imperfections will develop upon heat treatment if the heat transfer during polymerization has been inadequate, it is necessary to give sheets to be used for aircraft a heat treatment prior to examination for "optical quality."

Example II

The following composition was prepared:

|   | Parts |
|---|---|
| Methyl methacrylate monomer | 87 |
| Methyl methacrylate polymer | 3 |
| Dibutyl phthalate | 10 |
| Benzoyl peroxide | 0.2728 |

11.63 pounds of this composition were charged into a cell similar to that of Example I, except that the glass plates were spaced to yield a 0.150 inch sheet. The reaction in the water bath took place in 144 minutes at 150° F., during which time air was fed into the tank at the rate of 2.6 cubic feet per minute. The resulting sheet, after heat treatment, was of "optical quality" and had a finished size of 0.150" x 37" x 49."

Example III

The following composition was prepared:

|   | Parts |
|---|---|
| Methyl methacrylate monomer | 87 |
| Methyl methacrylate polymer | 3 |
| Dibutyl phthalate | 10 |
| Benzoyl peroxide | 0.0408 |
| Methacrylic acid | 0.07 |

28.5 pounds of this composition were charged into a cell similar to that of Example I, except that the glass plates were spaced to yield a 0.375 inch sheet. The reaction in the water bath took place in 335 minutes at 140° F., during which time air was fed into the tank at the rate of 2.6 cubic feet per minute. The resulting sheet, after heat treatment, was of "optical quality" and had a finished size of 0.375" x 37" x 49".

Example IV

The following composition was prepared:

|   | Parts |
|---|---|
| Methyl methacrylate monomer | 87 |
| Methyl methacrylate polymer | 3 |
| Dibutyl phthalate | 10 |
| Benzoyl peroxide | 0.0178 |
| Methacrylic acid | 0.5 |

36 pounds of this composition were charged into a cell similar to that of Example I, except that the glass plates were spaced to yield a 0.500 inch sheet. The reaction in the water bath took place in 525 minutes at 140° F., during which time air was fed into the tank at the rate of 2.6 cubic feet per minute. The resulting sheet, after heat treatment, was of "optical quality" and had a finished size of 0.500" x 37" x 49".

In the above examples the air was introduced into the liquid bath by means of perforated pipes placed slightly to either side of the cells being polymerized, only one cell being in the bath at a time. However, in commercial operation, the process is preferably carried out with several cells traveling through the bath as illustrated in the drawing so that the process is a continuous one. The process may, however, be carried out as a batch process by placing a plurality of cells in the liquid bath simultaneously and removing them simultaneously.

It will be understood that the above examples are merely illustrative and the present invention is by no means limited to the polymerization conditions specified nor to methyl methacrylate as the polymerizable liquid. While the invention is particularly advantageous in the casting of methyl methacrylate or modified methyl methacrylate polymer sheets suitable for aircraft enclosures and the like, the invention is obviously applicable in the casting of sheets for all purposes and to polymerizable liquids adapted to give more or less rigid polymers upon polymerization.

Polymerizable liquids adapted for use in the present invention include polymerizable derivatives of acrylic and methacrylic acids, and other alpha-substituted acrylic acid derivatives capable of forming rigid polymers, as well as styrene and other polymerizable compounds or mixtures of compounds which give rigid polymers. Specifically, ethyl methacrylate, methyl acrylate, and vinyl acetate may be mentioned as polymerizable liquids suitable for use in the present invention.

The particular composition of the polymerizable liquid may be varied widely in that it may comprise a single polymerizable compound or a mixture of two or more, and may or may not include polymerization catalysts, modifiers, dyes, and the like. As shown in the examples, it is practical and preferred to use as the polymerizable liquid a syrup of partially polymerized compound or, alternatively, a solution of polymer in monomer. The use of such casting syrups is well known in the art and it will be understood that the proportion of polymer in such syrups must be kept sufficiently low so that the syrup may be readily poured into the cells.

The particular temperature of the liquid bath and the duration of the polymerization cycle will be dependent to a great extent upon the polymerizable liquid used although, in general, a polymerization temperature may be used to give a reasonably rapid polymerization cycle. It is preferred to use water as the liquid bath although other liquids such as glycerine may be used, or aqueous solutions of soluble salts. Also, the liquid bath may be agitated by any gas as well as air so long as the gas selected has no deleterious effect on the equipment. For reasons of economy air is preferred.

An advantage of the present invention is that it provides a simple and inexpensive method of casting "optical quality" sheets of methyl methacrylate polymer and the like with a shorter polymerization cycle and higher yield than heretofore was possible. The invention provides a process adapted to give entirely adequate temperature control of the contents of the compressible gasket cell during the polymerization reaction and thus permits the use of higher polymerization temperatures without loss of yield of "optical quality" sheets. A further advantage of the invention is that it does not require expensive or complicated apparatus or operating conditions difficult to maintain.

As many apparently widely different embodiments of this invention may be made without departing from the spirit and scope thereof, it is to be understood that the invention is not limited to the specific embodiments thereof except as defined in the appended claims.

We claim:
1. Process for the production of cast sheets which process comprises filling a cell composed of two plates separated by a compressible gasket with a heat-polymerizable liquid capable of forming a substantially rigid polymer, while said cell is inclined at an angle less than 25° to the horizontal, immersing said cell in a heated liquid bath while thus inclined, thereafter rotating said cell to a substantially vertical position while immersed in said liquid bath and maintaining said cell in said vertical position in said liquid bath during the polymerization of the cell contents.

2. Process for the production of cast sheets which process comprises filling a cell composed of two plates separated by a compressible gasket with a heat-polymerizable liquid capable of forming a substantially rigid polymer, while said cell is inclined at an angle less than 25° to the horizontal, immersing said cell in a heated liquid bath while thus inclined, thereafter rotating said cell to a substantially vertical position while immersed in said liquid bath, maintaining said cell in said vertical position in said liquid bath during the polymerization of the cell contents, and passing a plurality of streams of gas bubbles through said liquid bath adjacent the surfaces of said cell during said polymerization.

3. Process for the production of cast sheets which process comprises filling a cell composed of two plates separated by a compressible gasket with a heat-polymerizable liquid capable of forming a substantially rigid polymer, while said cell is inclined at an angle less than 25° to the horizontal, immersing said cell while thus inclined in a heated water bath, thereafter rotating said cell to a substantially vertical position while immersed in said water bath, maintaining said cell in said vertical position in said water bath during the polymerization of the cell contents, and passing a plurality of streams of air bubbles through said liquid bath adjacent the surfaces of said cell during said polymerization.

4. Process for the production of cast sheets which process comprises filling a cell composed of two plates separated by a compressible gasket with a polymerizable liquid comprising methyl methacrylate while said cell is inclined at an angle less than 25° to the horizontal, immersing said cell in a heated liquid bath while thus inclined, thereafter rotating said cell to a substantially vertical position while immersed in said liquid bath and maintaining said cell in said vertical position in said liquid bath during the polymerization of the cell contents.

5. Process for the production of cast sheets which process comprises filling a cell composed of two plates separated by a compressible gasket with a polymerizable liquid comprising methyl methacrylate while said cell is inclined at an angle less than 25° to the horizontal, immersing said cell in a heated liquid bath while thus inclined, thereafter rotating said cell to a substantially vertical position while immersed in said liquid bath, maintaining said cell in said vertical position in said liquid bath during the polymerization of the cell contents, and passing a plurality of streams of gas bubbles through said liquid bath adjacent the surfaces of said cell during said polymerization.

6. Process for the production of cast sheets which process comprises filling a cell composed of two plates separated by a compressible gasket with a polymerizable liquid comprising methyl methacrylate while said cell is inclined at an angle less than 25° to the horizontal, immersing said cell while thus inclined in a heated water bath, thereafter rotating said cell to a substantially vertical position while immersed in said water bath, maintaining said cell in said vertical position in said water bath during the polymerization of the cell contents, and passing a plurality of streams of air bubbles through said liquid bath adjacent the surfaces of said cell during said polymerization.

BARNARD M. MARKS.
CLAYTON E. RANCK.